Figure 1:
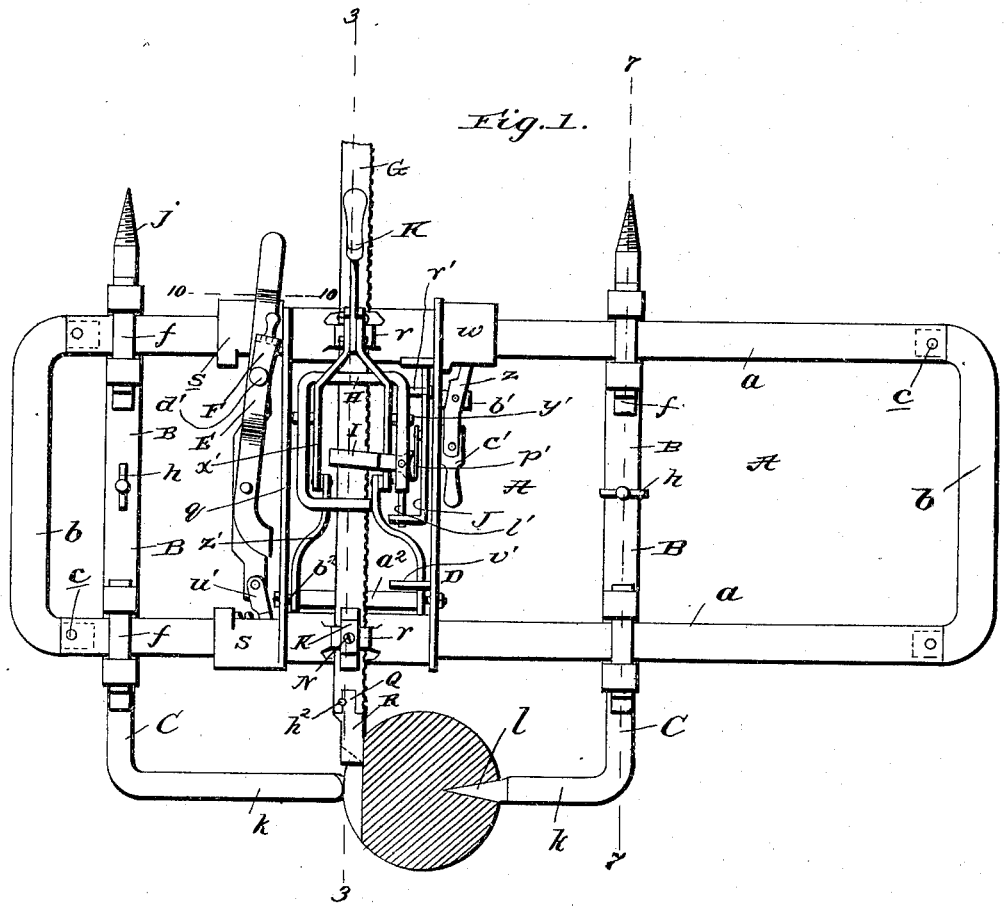

No. 627,147. Patented June 20, 1899.
J. K. P. SHELTON.
WOODWORKING MACHINE.
(Application filed Jan. 21, 1899.)

(No Model.) 4 Sheets—Sheet 1.

Witnesses:

Inventor
James K. P. Shelton
By James Shuhy
Attorney

No. 627,147. Patented June 20, 1899.
J. K. P. SHELTON.
WOODWORKING MACHINE.
(Application filed Jan. 21, 1899.)
(No Model.) 4 Sheets—Sheet 2.
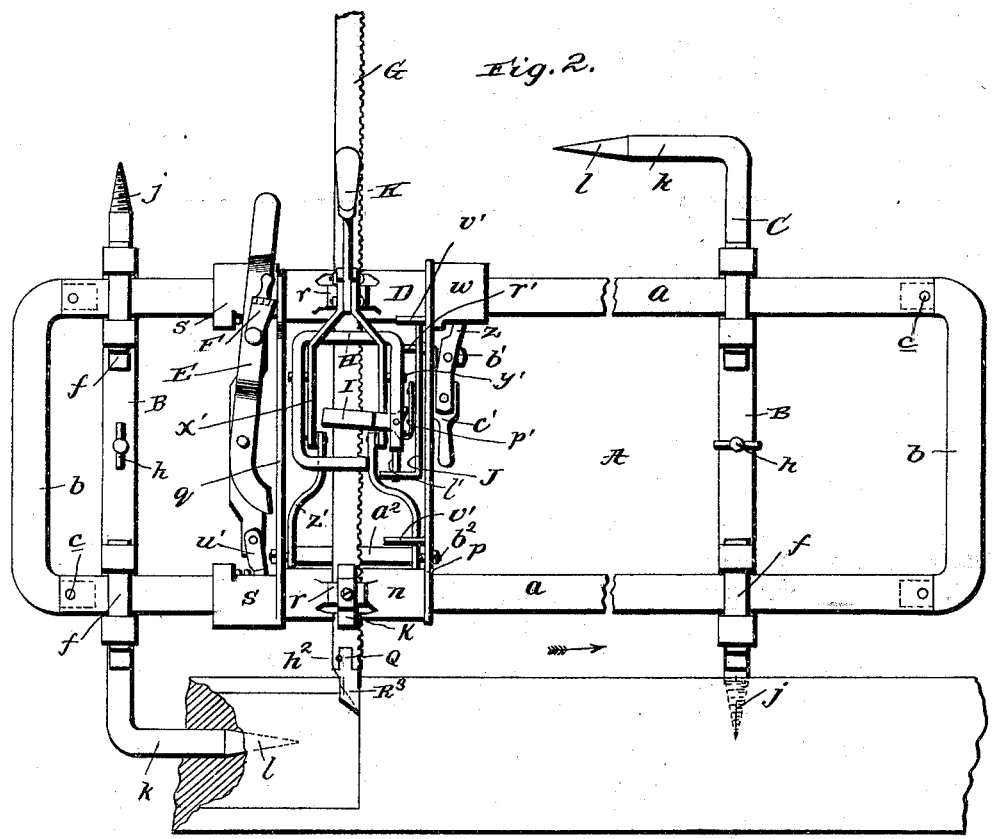
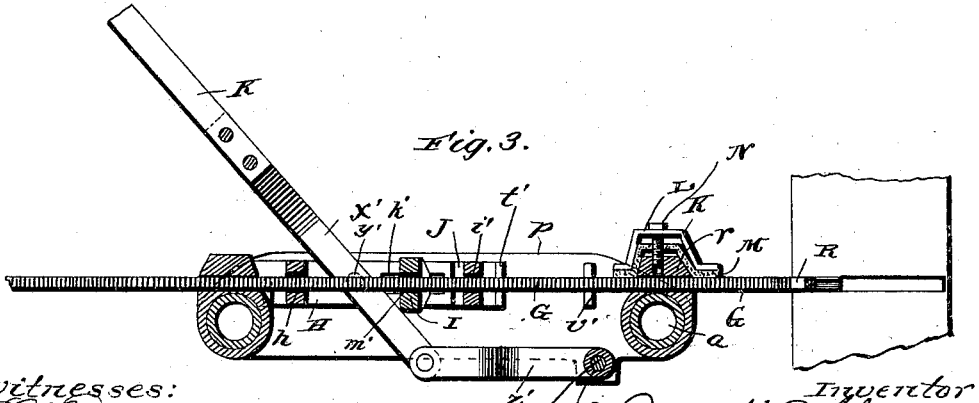

No. 627,147. Patented June 20, 1899.
J. K. P. SHELTON.
WOODWORKING MACHINE.
(Application filed Jan. 21, 1899.)
(No Model.) 4 Sheets—Sheet 3.
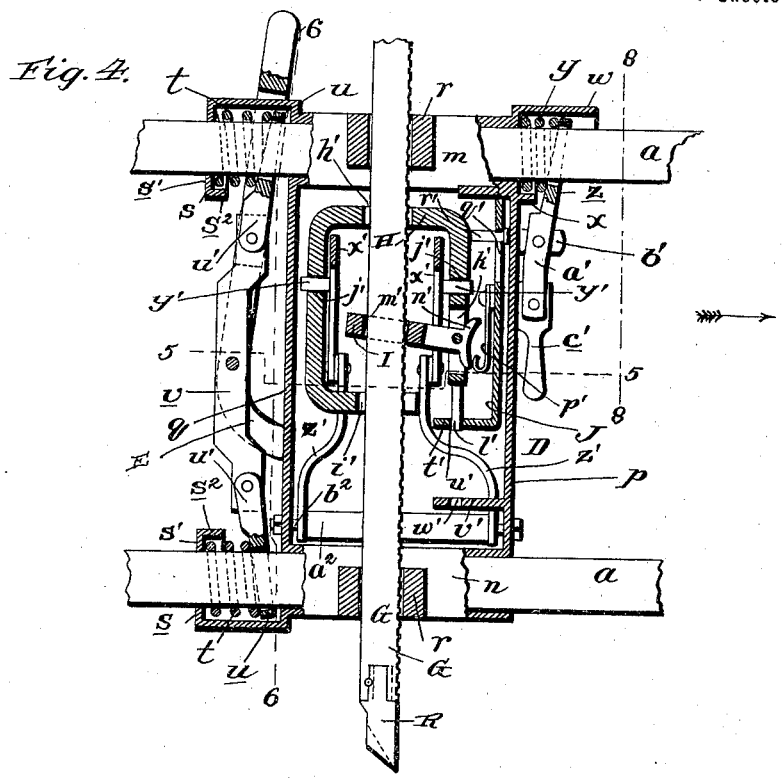
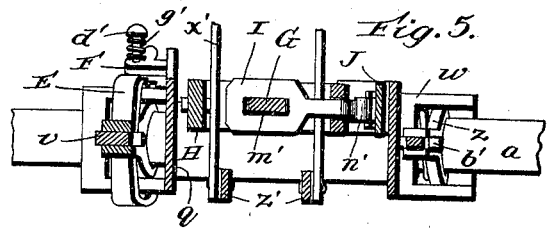
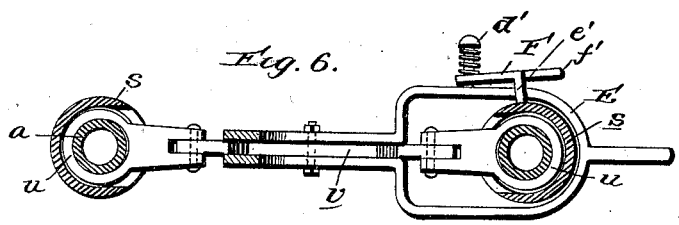
Witnesses:
Inventor
James K. P. Shelton
By James J. Sheehy
Attorney No. 627,147. Patented June 20, 1899.
J. K. P. SHELTON.
WOODWORKING MACHINE.
(Application filed Jan. 21, 1899.)
(No Model.) 4 Sheets—Sheet 4.
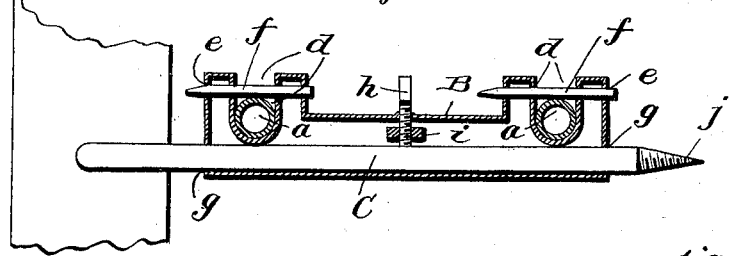
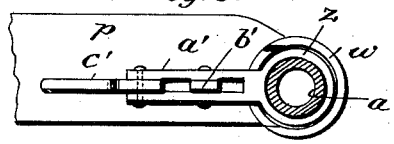
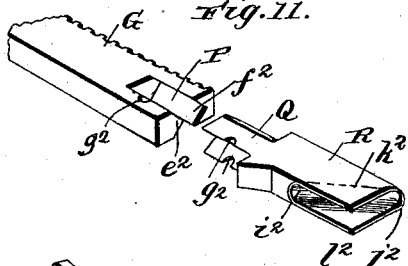
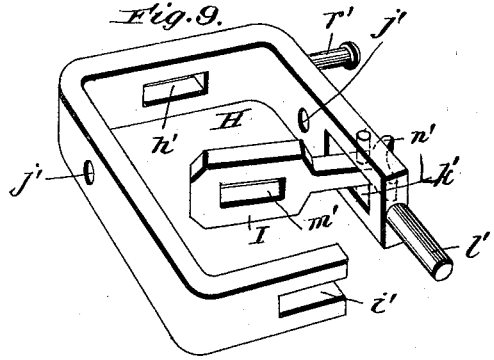
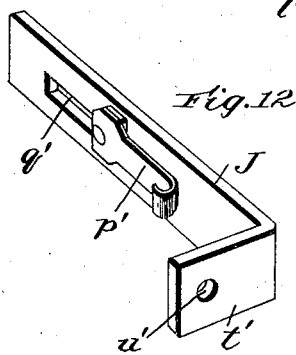
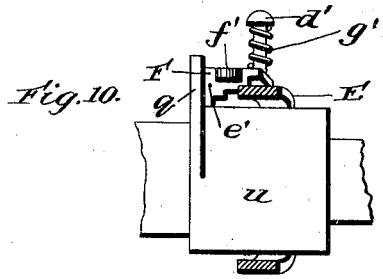
Witnesses:
Inventor
James K. P. Shelton.
By James Shuhy
Attorney

UNITED STATES PATENT OFFICE.

JAMES K. P. SHELTON, OF CUBA, ALABAMA.

WOODWORKING-MACHINE.

SPECIFICATION forming part of Letters Patent No. 627,147, dated June 20, 1899.

Application filed January 21, 1899. Serial No. 702,978. (No model.)

*To all whom it may concern:*

Be it known that I, JAMES K. P. SHELTON, a citizen of the United States, residing at Cuba, in the county of Sumter and State of Alabama, have invented new and useful Improvements in Woodworking-Machines, of which the following is a specification.

My invention relates to woodworking-machines, and contemplates the provision of a machine calculated to be used to advantage in felling large trees, in cutting felled trees into suitable lengths for saw-logs, shingle-blocks, and the like, and in cutting railway-sleepers and other timbers of rectangular form in cross-section from felled trees.

The invention will be fully understood from the following description and claims when taken in conjunction with the annexed drawings, in which—

Figure 1 is a top plan view illustrating the manner in which my improved machine is connected and arranged with respect to a tree to be felled, the tree being shown in section. Fig. 2 is a side elevation illustrative of the manner in which the machine is connected and arranged with respect to a felled tree when it is to be used to reduce a tree to a square timber or to a shape suitable for railway-ties. Fig. 3 is a transverse section taken in the plane indicated by the broken line 3 3 of Fig. 1. Fig. 4 is an enlarged detail longitudinal section of a portion of the machine shown in Fig. 1. Fig. 5 is a section taken in the plane indicated by the line 5·5 of Fig. 4. Fig. 6 is a section taken in the plane indicated by line 6 6 of Fig. 4. Fig. 7 is a section, on a reduced scale, taken in the plane indicated by the line 7 7 of Fig. 1. Fig. 8 is a detail section taken in the plane indicated by the line 8 8 of Fig. 4. Fig. 9 is an enlarged perspective view illustrating the chisel or cutter bar holding frame and its appurtenances. Fig. 10 is an enlarged detail section taken in the plane indicated by the line 10 10 of Fig. 1. Fig. 11 comprises disconnected perspective views of a portion of the chisel or cutter bar and a bit for use in conjunction therewith. Fig. 12 is a detail perspective view of an appurtenance of the carriage hereinafter referred to.

In the said drawings similar letters designate corresponding parts in all of the several views.

For the sake of convenience in description I will first describe the construction of my improved machine and then point out the manner in which it is applied and operated to effect the several ends for which it is adapted.

In the preferred embodiment of the invention the main frame A of the machine is made up of two longitudinal bars $a$, of gas-pipe or other suitable material, and two end bars $b$, of cast metal, which have their ends reduced and let into the ends of the bars $a$ and fixedly connected thereto by rivets $c$. Said main frame A is connected by boxes B to rods C and is designed to be fixed through the medium of the latter to the trunk of a standing tree or the trunk of a felled tree, as will hereinafter be described.

The boxes B are similar in construction, and therefore a description of the one shown in detail in Fig. 7 will suffice for both. Said box B is made hollow, with notches $d$ adjacent to its opposite ends, designed to seat the longitudinal bars of the frame A. It is provided with coincident openings $e$ in the opposite walls of the notches $d$ for the reception of wooden wedges $f$, which have for their purpose to secure the bars $a$ in the notches, and is also provided in its ends with coincident apertures $g$. These latter apertures are designed for the passage of a rod C, to which the box B is fixed by a set-screw $h$ bearing in the box and provided at its inner end with a nut $i$ to prevent its casual displacement. The rods C, which are secured in the boxes B and connected by the same to the frame A after the manner described, are each provided at one end with a taper-screw $j$ and at its opposite end with an angular arm $k$, terminating in a barb or point $l$, for a purpose presently pointed out. By reason of the manner in which the frame A, boxes B, and rods C are connected they may be readily disconnected and as readily reconnected. It will also be observed that the connection between said parts is such as to permit of the boxes B and rods C being readily adjusted in the direction of the length of the frame A and with respect to the same whenever desirable or necessary.

D is a carriage mounted and movable upon the longitudinal bars of the frame A. This carriage (see Fig. 4) is made in one piece and comprises upper and lower sleeves $m\ n$, which loosely receive the frame-bars $a$ and bars $p\ q$, which connect said sleeves. The sleeves are provided with coincident guide-eyes $r$ for the cutter or chisel bar presently described, and they are also provided at their rear ends with hoods $s$, which have end walls $s'$, provided with flanges $s^2$. The hoods $s$ are designed to receive springs $t$, which surround the frame-bars $a$, and their end walls are designed to afford a bearing, while the flanges on said end walls are designed to retain the springs in the hoods in the event of the carriage being removed from the main frame. The springs $t$ are interposed between the end walls of the hoods $s$ and ring-clutches $u$, and they have for their purpose to exert a pressure against the clutches, which have bifurcated shanks $u'$, and the said shanks are pivotally connected to a bar $v$, as shown in Figs. 4 and 6.

E is a bifurcated lever, which is shaped, as shown in Fig. 6, so as to enable it to straddle the upper hood $s$, the shank of the upper clutch, and the bar $v$. It has its arms pivoted on the bar $v$ and also has said arms curved forwardly from their pivotal point, so as to enable them to impinge against the frame-bar $q$. The purpose of lever E is to enable the operator to move the carriage in the direction of the large arrow.

The sleeve $m$ of the carriage has a hood $w$ at its forward end, which is flanged at its inner end, as indicated by $x$. In this latter hood is arranged a spring $y$, which surrounds the adjacent frame-bar and bears at its outer end against a clutch $z$. This clutch has a shank $a'$, which is fulcrumed on a lug $b'$ on the frame-bar $p$ and is fixedly connected to a handle $c'$. To move the carriage forwardly through the medium of the lever E, the operator has but to push the upper end or handle of the lever toward the left. When this is done, the lower end of the lever bears against the carriage, and the lever, acting as a lever of the second order, with its fulcrum on the carriage, forces the clutches or chucks $u$ into engagement with the frame-bars $a$. Then when the clutches bite against the bars $a$ the lever acts as a lever of the first order, with its fulcrum on the bar $v$, and thereby forces the carriage forward until stopped by the meeting of the flanges $s^2$ with the clutches. The clutch $z$ is designed to hold the carriage against casual retrograde movement on the frame during the disengagement of the clutches $u$ from said frame precedent to the forward movement of the carriage. Immediately after the carriage is forced forwardly, as described, and when the forward clutch $z$ bites bar $a$ to hold the carriage against casual back movement, the clutches or chucks $u$ are forced forward or to the right by the spring $t$, carrying with them the bar $v$ and the lever E, until stopped by the bearing of the lever against the carriage at its lower end and at its upper end, where is placed the regulating lever or gage F, presently described. When it is desired to move the carriage rearwardly, it is simply necessary for the operator to grasp the handle $c'$ and disengage clutch $z$ from the frame-bar and then push the carriage rearwardly.

For the purpose of regulating the extent of the forward movements of the lever E, which is connected to the clutches $u$, and therefore governs the forward movements of the carriage, I provide the regulating-lever F. This lever F is fulcrumed on a headed pin $d'$, extending laterally from one arm of lever E, and is provided with a stepped rack $e'$ and a handle $f'$. A coiled spring $g'$ is arranged on the pin $d'$ and is designed to press the lever F against the arm of lever E and hold the particular step of lever F, which is in engagement with lever E, against casual release therefrom. The lever F is arranged to engage the rear frame-bar $q$ of the carriage and thereby limit the forward throw of the lever. By changing the position of the lever F with respect to the arm of lever E the throw of lever E may be readily increased or diminished at pleasure.

G designates the cutter or chisel bar of the machine, which is of a size to pass loosely through the eyes $r$ of the carriage and has its front edge notched, as shown in Figs. 4 and 11, and H is the chisel-bar frame. The frame H is preferably formed of a single bar of metal bent into the shape shown in Figs. 4 and 9. It has an opening $h'$ in the middle of its upper portion and also has a bifurcation $i'$ in one of its ends, the said opening and bifurcation being alined and being sufficiently large for the loose passage of the bar G. Said frame H is also provided with eyes $j'$ in its opposite side bars, with a slot $k'$ in one side bar and with a round terminal $l'$ on the same bar. In the slot $k'$ of the frame H is pivoted a clutch I, which has an eye $m'$, receiving the bar G, and also has a T-head $n'$ at its outer end. This head is concave at its outer side for the engagement of a J-formed spring $p'$, which is carried by a slide J. The slide J is longitudinally slotted at $q'$ to loosely receive a stud $r'$ on the frame H and is provided at its lower end with an angular branch $t'$, having an aperture $u'$ loosely receiving the round terminal of frame H. The angular branch of the slide is designed to engage a lug-stop $v'$ on the carriage-bar $p$, while the terminal $l'$ of the frame H is designed to take loosely through an opening $w'$ in the lug-stop in a manner presently described.

K is a lever for reciprocating the frame H. The said lever is bifurcated, as shown, and its branches $x'$ have trunnions $y'$ journaled in the apertures $j'$, as shown. At their lower ends the said branches $x'$ of the lever are pivotally connected to links $z'$, which are held apart by a sleeve $a^2$ and are pivotally connected by a long bolt $b^2$ to the bars $p$ $q$ of the carriage D.

For the purpose of preventing casual movement of the chisel-bar G when in use I provide a friction brake-shoe K'. It comprises a metallic spring-strip L of a size to straddle one of the eyes $r$ on carriage D, a strip M, of felt or leather, also straddling the eye $r$ and interposed between the ends of the strip L and the bar G, and a screw N, which takes through the strip L and into a threaded socket in the wall of the eye. By turning in the screw N the friction against the bar G is increased, while by turning said screw outwardly the friction is diminished.

The bar G is preferably of steel and tempered like a saw-blade. It is provided at one end with a notch P, designed to receive the shank Q of a bit R. One of the side walls of the notch P is provided with an angular rib $e^2$, and its opposite wall has a groove $f^2$ of angular form. The bit-shank Q is of a shape in cross-section corresponding to the notch P, and from this it follows that when the shank is placed in said notch the bit will be firmly and securely held against lateral deflection. In one wall of the notch P and in one side of the bit-shank Q are formed semicircular grooves $g^2$, which when they register are designed to receive a connecting-key $h^2$, as shown in Fig. 2.

The bits employed in conjunction with the bar G are similar in construction, with the exception that the bit R, (shown in Fig. 11,) which is designed to cut trees crosswise, is somewhat broader than the slab-cutting bit $R^3$. (Shown in Fig. 2.) This being so, a description of the bit shown in Fig. 11 will suffice for both. Said bit R is at its lower end of U shape in cross-section, being gouged out at its rear side and provided with the inner inclined wall $i^2$ and the three cutting edges $j^2$, $k^2$, and $l^2$.

When my improved machine is to be used to cut slabs from a felled tree, so as to reduce the same to a square timber or to a shape in cross-section suitable for railway-sleepers, the pointed end of one of the dogs or rods C is driven into the end of the log, and the taper-screw of the other rod C is turned into the log at an intermediate point in the length thereof, the angular arm $k$ of said rod affording leverage for the purpose. The frame A is then connected to the rods C by the boxes B and their appurtenances, the said frame being of course fixed in proper position with respect to the log to be cut. The cutting is effected by forcing the bit $R^3$ down through the tree so as to form a kerf therein, and after the bit has been forced down through the tree it is raised up and out of the same. Subsequent to each downward and upward passage of the bit through the log the carriage D is moved forwardly a distance corresponding to the width of the bit by the means before described, so as to carry the bit into position for another cut. In this way the log is cut throughout its length, or, in other words, a slab is taken from said log, leaving the same with a flat side. By turning the log and repeating the described operation the log may be reduced to a shape in cross-section that will render it suitable for use as a railway-sleeper or may be reduced to a square timber.

In cutting a log when the carriage D has been moved forwardly to the forward rod C the box B on the rear rod C is disconnected from the frame A, and said rear rod C is knocked out of the log. The thumb-screw $h$ of the forward box B is then loosened and the forward rod C is turned out of the log, the angular arm $k$ serving as a lever for the purpose. With this done the forward rod C, with the frame, is moved forwardly to the extent desired, and said forward rod is again turned into the log, after which the box B on the other or rear rod is connected to the frame, and said rear rod is also turned into the log.

It will be appreciated from the foregoing that by reason of its construction the forward rod C may be conveniently disconnected from the log without being removed from the frame, which is an important advantage.

The bit $R^3$ in making each cut is forced step by step through the log by the operator through the medium of the lever K and the frame H and its appurtenances. With the parts in the position shown in Fig. 4, when the lever K is depressed the frame H will move downwardly and by reason of its clutch I engaging the bar G will carry the said bar with it and force the bit $R^3$ down into the log. On the up movement of the lever the frame H will move upwardly and its clutch I will ride up on the bar G, leaving said bar in the position to which it was forced by the preceding down movement of the lever. On the subsequent depression of the lever K the clutch I will take a new hold on the bar G and will again force the same downwardly. This operation is continued until the bit $R^3$ is forced entirely through the log. When the bit is thus forced through the log, the resistance to the downward movement of the lever K is removed, and hence the downward movement of the said lever which effects the completion of the forcing of the bit through the log will be greater than the previous downward movements. In consequence of such extraordinary downward movement of the lever K the slide J will strike the lug-stop $v'$ on the carriage-bar $p$ and will be forced upwardly, with the result that its spring $p'$ will be carried from the lower arm of the T-head of the clutch to the upper arm thereof. By virtue of this the position of the clutch with respect to the bar G will be changed, and on the up movement of the lever K and frame H the bar G will move up with the same. It will also be observed that with the clutch in the position last named said clutch will move up with and down on the bar G, so that by oscillating the lever K the bar G may be drawn up through and out of the log. When the bar G has been drawn up through and out of the log and the carriage D has been moved forwardly to carry the bit into position for another cut, the lever K is raised to an extraordinary extent. This will cause the slide J to engage the upper sleeve m of the carriage D, as shown in Fig. 4, so as to cause the spring $p'$ to bear against the lower arm of the head on the clutch I for the purpose before described.

When my improved machine is to be used for felling standing trees, the frame A is disposed with respect to the tree, as shown in Fig. 1, and is connected to the same through the medium of the rods C after the manner illustrated. In felling a tree or in cutting the same into lengths suitable for saw-logs, shingle-blocks, &c., the parts of the machine not mentioned in connection with Fig. 1 are operated in the same manner as when the machine is used to cut slabs.

In cutting a log into lengths suitable for saw-logs or shingle-blocks the machine is disposed with respect to the log in the same manner that it is disposed with respect to the standing tree shown in Fig. 1.

I have entered into a specific description of the construction and relative arrangements of the parts of my improved machine in order to impart a full, clear, and exact understanding of the same. I do not desire, however, to be understood as confining myself to such specific construction and arrangement of parts, as such changes or modifications may be made in practice as fairly fall within the scope of my invention.

Having described my invention, what I claim, and desire to secure by Letters Patent, is—

1. In a woodworking-machine, the combination of a main frame, a box connected thereto, a removable stock-engaging rod arranged and adapted to turn in the box and having a screw at one end and an angular pointed arm at its opposite end, and means for securing the rod in the box, substantially as specified.

2. In a woodworking-machine, the combination of a main frame comprising a bar, a rod for engaging a piece of stock, a box having a notch receiving the frame-bar and an aperture for the passage of the rod, a wedge arranged in the opposite walls of the notch in the box for securing the frame-bar in said notch, and a screw bearing in the box and arranged to bind against the rod, substantially as specified.

3. In a woodworking-machine, the combination of a main frame comprising longitudinal bars, rods having taper screws at one end and angular pointed arms at their opposite ends, hollow boxes having notches receiving the bars of the frame, and coincident apertures for the passage of the rods, wedges arranged in the opposite walls of the notches in the boxes for securing the frame-bars in said notches, and screws bearing in the boxes and arranged to bear on the rods, substantially as specified.

4. In a woodworking-machine, the combination of a suitable frame or support, a cutter-bar, a movable cutter-bar frame mounted in the frame or support, a clutch carried by said movable bar and arranged when inclined in one direction to engage and move the cutter-bar in one direction with the movable frame and when inclined in the opposite direction to engage and move the cutter-bar in the other direction with the movable frame, and coacting devices on the frame or support and movable frame for reversing the inclination of the clutch, substantially as specified.

5. In a wood-working machine, the combination of a main frame, a carriage movable on said frame, clutches for engaging the frame, springs interposed between the carriage and the clutches, a bar interposed between and connected to the clutches, and a lever pivotally connected at an intermediate point of its length to said bar at a point between the clutches and arranged to bear against the carriage, substantially as specified.

6. In a woodworking-machine, the combination of a main frame, a carriage movable on said frame, a spring-pressed, frame-engaging clutch disposed at one side of the carriage for holding said carriage against backward movement, spring-pressed, frame-engaging clutches arranged at the opposite side of the frame, a bar interposed between and connected to the latter clutches, and a lever pivotally connected at an intermediate point of its length to said bar at a point between the latter clutches and arranged to bear against the carriage, substantially as specified.

7. In a woodworking-machine, the combination of a main frame comprising longitudinal bars, a carriage having sleeves loosely mounted on the bars; one of said sleeves having hoods at its opposite ends and the other having a hood at its rear end, ring-clutches receiving the frame-bars and arranged in the hoods at the rear side of the carriage, coiled springs surrounding the frame-bars and interposed between the clutches and the end walls of the hoods, a bar interposed between and connecting the clutches at the rear side of the carriage, a lever pivotally connected to said bar and adapted to engage the carriage, a ring-clutch arranged on a frame-bar and in the forward hood and having a shank fulcrumed on the carriage, and a coiled spring surrounding the frame-bar and interposed between the carriage and said clutch, substantially as specified.

8. In a woodworking-machine, the combination of a frame, a carriage clutched to the frame and movable thereon, a chisel-bar, a frame mounted in the carriage and movable with respect to the same, a clutch carried by said frame for engaging the chisel or cutter bar, and means for moving the said movable frame, substantially as specified.

9. In a woodworking-machine, the combination of a frame, a carriage movable on the frame, one or more movable clutches for holding the carriage against retrograde movement and for advancing the same on the frame, a chisel or cutter bar, a frame mounted in and movable with respect to the carriage, a clutch carried by said frame for engaging the chisel or cutter bar, and means for moving said movable frame, substantially as specified.

10. In a woodworking-machine, the combination of a frame, a carriage clutched to the frame and movable thereon, a chisel or cutter bar, a frame mounted in the carriage and movable with respect to the same, a clutch carried by said frame for engaging the chisel or cutter bar, means for moving the said movable frame, and coacting devices on the movable frame and carriage for reversing the disposition of the clutch with respect to the chisel or cutter bar, substantially as specified.

11. In a woodworking-machine, the combination of a frame or body, a cutter-bar, a movable cutter-bar frame, a clutch carried by said frame for engaging the cutter-bar, a lever connected to the cutter-bar frame, and a link connecting said lever and the frame or body, substantially as specified.

12. In a woodworking-machine, the combination of a frame or body, a cutter-bar, a movable cutter-bar frame, a clutch pivotally mounted in the cutter-bar frame and having an eye receiving the cutter-bar and also having a T-head, suitable means for moving the cutter-bar frame, and a slide, carried by the cutter-bar frame, and arranged to engage the T-head and be engaged and moved by the frame or body, substantially as specified.

13. In a woodworking-machine the combination of a frame or body, a cutter-bar, a movable cutter-bar frame, a clutch carried by said movable frame for engaging the cutter-bar and moving it in one direction with the frame, suitable means for moving the cutter-bar frame, and a friction-shoe carried by the frame or body and bearing against the cutter-bar, substantially as specified.

14. In a woodworking-machine, the combination of a main frame, a carriage movable on the frame, one or more movable clutches for holding the carriage against retrograde movement and for advancing the same on the frame, a hand-lever connected with the clutch or clutches, and a device, for regulating the throw of the lever, adjustably connected to said lever and arranged to engage the carriage, substantially as specified.

15. In a woodworking-machine, the combination of a main frame, a carriage movable on the frame, one or more movable clutches for holding the carriage against retrograde movement and for advancing the same on the frame, a hand-lever connected with the clutch or clutches, and a spring-pressed regulating-lever pivotally connected to the hand-lever and having a rack for engaging the same; said regulating-lever being arranged to engage the carriage, substantially as specified.

16. In a woodworking-machine, the combination of a frame or body, a cutter-bar, a cutter-bar frame movable with respect to the frame or body, means for moving said cutter-bar frame, a clutch carried by the cutter-bar frame for engaging the cutter-bar, and a friction-shoe arranged on the frame or body and bearing against the cutter-bar, substantially as specified.

In testimony whereof I have hereunto set my hand in presence of two subscribing witnesses.

JAMES K. P. SHELTON.

Witnesses:
J. H. HOLMES,
R. CLAY.